United States Patent [19]

Mallener et al.

[11] Patent Number: 4,735,767
[45] Date of Patent: Apr. 5, 1988

[54] METHOD AND DEVICE FOR REDUCING THE ACTIVITY OF A GAS-COOLED STACKED-BALL NUCLEAR REACTOR

[75] Inventors: Werner Mallener, Düsseldorf; Theodor Overhoff, Niederzier, both of Fed. Rep. of Germany

[73] Assignee: Kernforschungsanlage Julich GmbH, Julich, Fed. Rep. of Germany

[21] Appl. No.: 902,006

[22] Filed: Aug. 27, 1986

Related U.S. Application Data

[63] Continuation of Ser. No. 657,332, Oct. 3, 1984, abandoned.

[30] Foreign Application Priority Data

Oct. 3, 1983 [DE] Fed. Rep. of Germany ....... 3335888

[51] Int. Cl.[4] .............................................. G21C 7/00
[52] U.S. Cl. ..................... 376/337; 376/327; 376/328; 376/329
[58] Field of Search ................ 376/327–329, 376/336–338

[56] References Cited

U.S. PATENT DOCUMENTS

| 3,398,051 | 8/1968 | Seltord | 376/338 |
| 3,565,762 | 2/1971 | Nickel | 376/338 |
| 4,025,388 | 5/1977 | Jackson | 376/338 |
| 4,279,697 | 7/1981 | Overhoff et al. | 376/336 |

FOREIGN PATENT DOCUMENTS

| 1102919 | 3/1961 | Fed. Rep. of Germany . | |
| 1204346 | 11/1965 | Fed. Rep. of Germany | 376/336 |
| 1564226 | 8/1973 | Fed. Rep. of Germany . | |
| 866305 | 4/1961 | United Kingdom | 376/328 |

OTHER PUBLICATIONS

Apex–492, 5/59, pp. 7, 16, 20, 71–74.

Primary Examiner—Harvey E. Behrend
Attorney, Agent, or Firm—Karl F. Ross; Herbert Dubno

[57] ABSTRACT

A quenching element of the size and shape of a graphite nuclear fuel ball is introduced to the stacked balls of a stacked ball nuclear reactor core to release a neutron absorbing substance upon being heated to a predetermined temperature, thereby controlling the reactivity of the reactor by causing this substance, which may be a gadolinium compound, to deposit upon the graphite surfaces of the fuel element balls.

4 Claims, 2 Drawing Sheets

METHOD AND DEVICE FOR REDUCING THE ACTIVITY OF A GAS-COOLED STACKED-BALL NUCLEAR REACTOR

This is a continuation of application Ser. No. 657,332 filed on Oct. 3, 1984, now abandoned.

CROSS REFERENCE TO RELATED APPLICATION

This application s related to the concurrently filed copending application Ser. No. 656,989 and filed by us and commonly assigned herewith, corresponding to German application No. P 33 35839.7 filed Oct. 3, 1983.

FIELD OF THE INVENTION

Our present invention relates to a method of reducing the activity or reactivity of a gas-cooled nuclear reactor of the stacked or piled ball type in which the nuclear fuel elements are graphite balls containing the fissionable material. Our invention also relates to a quenching element which can be introduced into such a reactor to quench the latter by neutron absorption.

BACKGROUND OF THE INVENTION

Nuclear reactors, because of the requirement for absolute safety in operation, generally are provided with a number of independently triggerable or operable control or regulating systems for the reactivity of the reactor core and, in an emergency or for other reasons, for shutting down the nuclear reactor. In general at least two safety systems are provided of such nature that, once the emergency has abated, the reactor can once again be placed in operation.

In German open application No. DE-OS 27 53 928 and the corresponding U.S. Pat. No. 4,279,697, a safety system for shutting down a nuclear reactor has been described in which a gadolinium-containing substance is introduced into the cooling gas circulation of a stacked or piled ball reactor.

Such a reactor generally comprises a column through which the fuel elements, in the form of graphite balls containing the fissionable material are circulated, usually with a residence time corresponding to the fissionable life of the material of this element. The fuel balls, therefore, generally pass through the column or stack only once. The cooling gas is circulated directly through the column and hence through the interstices of the stack.

When the gadolinium-containing substance is introduced into the gas circulation, gadolinium is deposited on the porous surfaces of the graphite fuel balls of the reactor core on the surfaces of the open pores of the graphite.

The more gadolinium which is deposited upon the surface, the lower will be the reactivity of the nuclear reactor because of the resulting absorption of neutrons.

Since gadolinium in its natural isotopic mixture has practically the highest absorption cross section for thermal neutrons of naturally occurring chemical elements, for shutdown of a nuclear reactor of the piled ball type, it suffices to deposit a comparatively small amount of gadolinium on the surfaces of the nuclear fuel elements.

Since the gadolinium is deposited upon the fuel balls which are replaceable, it suffices for reactivating the reactor to desorb the gadolinium from the fuel elements by raising the reactor temperature and flushing it through with gas that does not contain gadolinium, or to decompose the gadolinium by nuclear reaction into other nuclides, or by a combination of these methods. The decomposing of gadolinium can be carried out, if necessary, by adding fresh nuclear fuel elements into the reactor core.

The gadolinium-containing substances which are used are generally gadolinium compounds which can be introduced as sols, solutions or gases into the reactor core. For shutdown of such a reactor an aqueous gadolinium acetate solution has been found to be preferable whereas the gaseous gadolinium compounds which are preferred are gadolinium aluminum isopropoxide $Gd(Al(C_3H_7O)_4)_3$ and gadolinium tricyclopentadienyl $Gd(C_5H_5)_3$, the latter, having no liquid phase, being introduced as a vapor of a solid upon sublimation.

When a bypass to the cooling gas circulation is used to feed the substances into the reactor, one must be certain that the cooling gas circulation is intact in spite of the development of the emergency condition which necessitated the quenching of the reaction. Naturally, should the emergency result from a breakdown of the gas circulation, this mode of emission of the quenching compounds will not be satisfactory. Accordingly, this earlier system can require the provision of additional piping systems for admission of the solution of gas containing the quenching agents.

OBJECTS OF THE INVENTION

It is the principal object of the present invention to provide an improved method of reducing the activity of a nuclear reactor of the type described which eliminates the need for such additional piping and also can be used when there is a failure of the cooling gas circulation.

Another object of this invention is to provide an improved method of introducing gadolinium or like activity-reducing elements into a nuclear reactor so as to increase the reliability of a shutdown operation in the event of the development of a dangerous situation.

Still another object of the invention is the provision of an improved article, device or element adapted to be used in the quenching of a nuclear reactor.

SUMMARY OF THE INVENTION

These objects and others which will become apparent hereinafter are attained, in accordance with the present invention, in a method of reducing the reactivity of a gas-cooled stacked-ball nuclear reactor utilizing fuel balls composed of graphite and containing the nuclear fuel which comprises introducing into the reactor core, ball-shaped activity-reducing elements having dimensions corresponding to those of the nuclear fuel elements and containing a neutron absorption substance which is released into the surrounding core at a predetermined temperature.

With the method of the invention, because the activity-reducing balls have the same form and size as the fuel elements, they can be introduced into the reactor core by the same means as is used for feeding the balls to the reactor. Hence the invention can be used in pre-existing reactors without modification or even in prior reactors without altering basic design concepts. The activity-reducing elements which are used can comprise a shell containing the activity-reducing substance and means, e.g. a fusible plug or stopper, for releasing the neutron-absorbing material at a predetermined temperature.

The temperature at which this substance is liberated is, of course, the temperature at which shutdown of the reactor should be triggered.

The shutdown elements can therefore be present during operation and merely recirculated through the reactor, although in best mode operation will simply be deposited upon the pile of fuel balls when the temperature rise indicates that an emergency situation may be in progress. Indeed, the elements of the invention can be used to hold the reactivity down during a start-up phase of the reactor and for shutdown of the nuclear reactor in its various operating phases. Reactivity-reducing elements or balls can be prepared which are capable of releasing the entraining absorbing substance at different temperatures, for example, by appropriate selection of the fusible material, so that selectivity in the shutdown or activity-reducing characteristics can be obtained.

The shutdown or reactivity-reducing elements themselves are also a subject of the invention and details thereof will be apparent from the description below.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
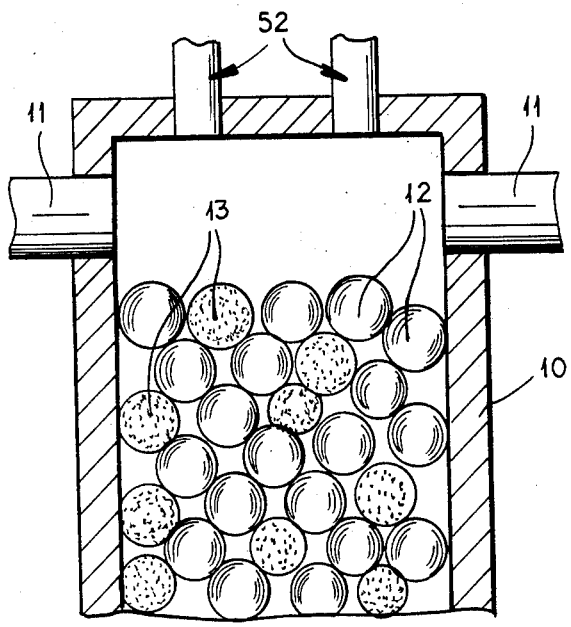
FIG. 1 is a diagrammatic section through a reactor core to which the present invention is applicable.

As can be seen from FIG. 1, a piled-ball nuclear reactor comprises a core which can be formed with a reflector 10 and nuclear fuel elements 12 in the core which is traversed by a cooling gas passing into the core through the cooling-gas conduit 11 as described in U.S. Pat. No. 4,279,697.

According to the invention, to shut down the reactor or control the reactivity thereof by reducing the activity, shutdown elements 13 can be added. The fuel balls can be composed in the usual manner of graphite-containing fissionable fuel such as uranium oxide.

Figure 2:
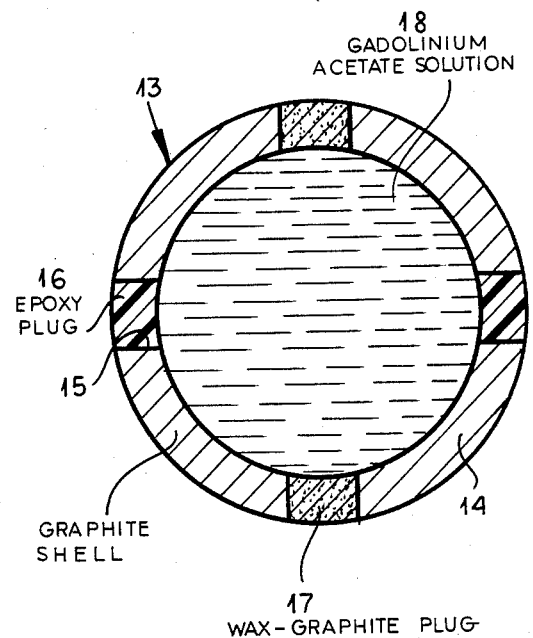
FIG. 2 is a diagrammatic cross section through an activity-reducing element according to the invention.

Means for feeding the balls to the reactor is used to deposit the balls 12 and 13 on top of the core to introduce the balls into the core. The ball feeder has been represented by the arrows 52. As can be seen from FIG. 2, an activity-reducing ball 13 can comprise a graphite shell 14 containing the absorbable substance 18 in the form of a solution, e.g. a gadolinium acetate solution. A number of holes 15 can be formed in each ball and can be closed by epoxy plugs 16 or plugs 17 composed of a wax/graphite mixture so that these plugs melt or decompose at a predetermined temperature whereupon the heat in the reactor can evaporate the solution and drive the neutron-absorbent agent out of the shell 14 and onto the fuel element.

Figure 3:
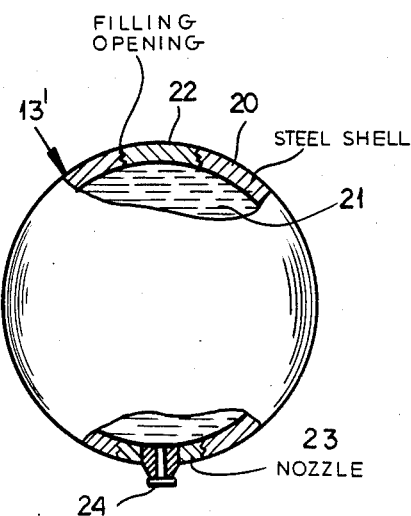
FIG. 3 is an elevational view, partly broken away at such elements.

FIG. 3 shows an embodiment of the invention in which a steel shell 20 is used for a ball 13' which can have a large opening closed by the plug 22 and a further opening receiving a spray nozzle 23 which can be closed by the fusible patch 24. The nozzle 23 discharges an atomized spray of the gadolinium acetate solution 21.

Figure 4:
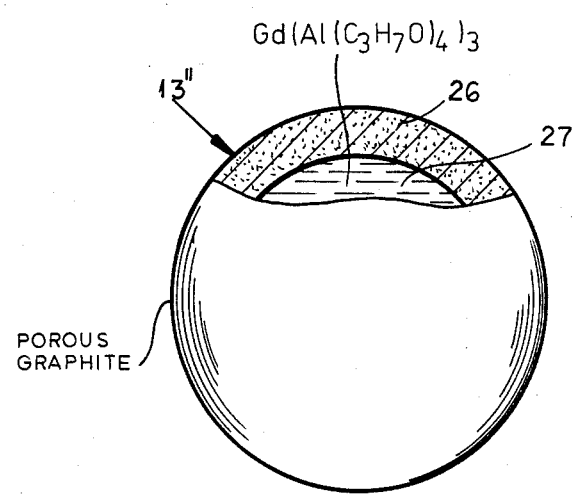
FIG. 4 is an elevational view, partly broken away of a shutdown element embodying principles of the invention.

In FIG. 4 the ball 13" is shown to comprise a porous graphite shell 26 containing the vaporizable absorbing substance 27 which, upon evaporation and expansion, is propelled through the pores of the shell. The pores are dimensioned so as not to release the absorbing substance at temperatures below the threshold temperature for release of this substance.

Figure 5:
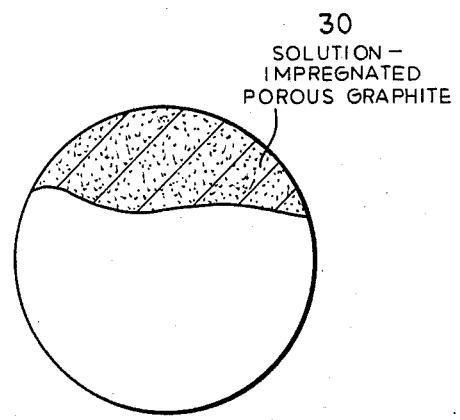
FIG. 5 is a fragmentary sectional elevational view of yet another shutdown element.

FIG. 5 shows an embodiment in which the porous or graphite body 30 is solid and is impregnated with the solution so that it is released by evaporation.

Figure 6:
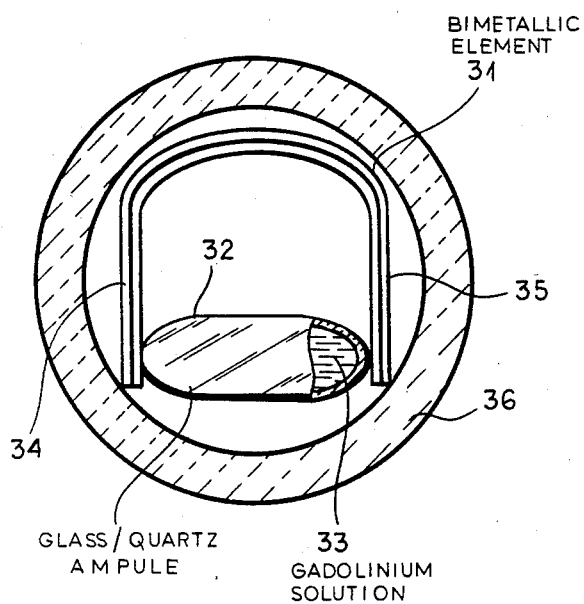
FIG. 6 is a section through a shutdown element provided with mechanical means for releasing the activity substance.
Figure 7:
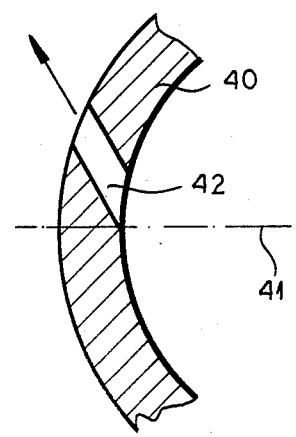

In FIG. 6, the graphite shell 36 encloses a bimetallic element 31 whose arms 34 and 35 receive a glass or quartz ampule 32 between them, this ampule containing the gadolinium solution 33. When the threshold temperature is reached, the arms 34 break the ampule 32 between them and release the solution which is evaporated at the elevated temperature and the vapors then can pass through the porous shell 36.

In the embodiments illustrated, the shell can be provided with orifices 42 in the wall 40 which are inclined to a radius, e.g. at an angle of 45°, so that a spin is imparted to the ball to assist in distributing the neutron-absorbent substance.

Figure 8:
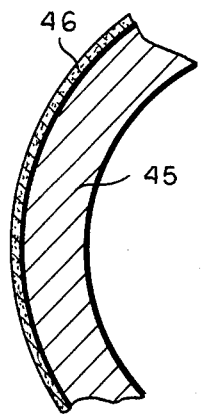
FIGS. 7 and 8 are partial sections through the shells of activity-reducing elements according to the invention, showing other features thereof.

In FIG. 8, we show that a steel shell 45, where used, can be provided with a graphite coating 46 which imparts to the ball the surface (friction etc) characteristics of the fuel balls which have graphite outer surfaces.

SPECIFIC EXAMPLES

EXAMPLE 1

A hollow, ball-shaped shutdown element of graphite is filled with aqueous gadolinium acetate solution (see U.S. Pat. No. 4,279,697) and the four openings in the resulting ball, each having a diameter of about 1 mm, are closed either with epoxy resin as an example of a synthetic resin closure or a various graphite powder mixture. The ball was deposited upon a graphite ball pile at a temperature of 500° C. and a height of 50 cm, simulating the packing of fuel element balls of a nuclear reactor.

When the ball containing the absorbing substance was placed upon the pile, the closures melted away shortly after introduction of the shutdown ball and at the elevated temperature boiling gadolinium acetate was sprayed out of the element and coated the graphite balls of the pile.

Analytic tests showed that the graphite pile balls were substantially uniformly coated with traces of solvent residue and the gadolinium compound. Calculations showed that the gadolinium distribution was sufficient to quench completely a similar pile of graphite fuel elements in a fusion reactor.

EXAMPLE 2

A thin wall hollow ball of steel was filled with the aqueous gadolinium solution and deposited upon the graphite ball pile under the conditions described in Example 1, except that the ball was placed upon the pile while the pile was cold. The hollow steel ball had two openings, one of 5 mm diameter which was used to fill the ball with the neutron-absorbing substance and in which a fitting was hermetically sealed and a second opening of a diameter of 1 mm forming a nozzle and from which the substance was sprayed; a plastic closure as in Example 1 or a fusible metal closure could be applied to the nozzle. The test was made with a lead alloy whose melting point was exactly 300° C.

The pile was then heated with the shutdown element thereon and the fusible element melted away at 300° C. to release a spray of the gadolinium acetate solution which was found to be uniformly distributed on the graphite balls in a quantity sufficient to shut down an equivalent nuclear reactor. A subsequent test in a nuclear reactor confirmed this result.

EXAMPLE 3

A steel ball as in Example 1 was provided with a nozzle which was of a diameter of 1 mm at its narrowest point. The nozzle was of the so-called untuned type. The outflow from such a nozzle has oscillations generated therein by periodic instability of Mach phenomena. A test of this device in the manner described in Example 2 showed that the gadolinium acetate solution was sprayed in a very fine spray distribution on the balls of the graphite ball pile. After cooling, it was found that the ball elements of not only the upper layer but practically the entire body of balls was uniformly coated with a highly adherent particle-like distribution of gadolinium which also coated the wall of the vessel. The analytic test showed gadolinium on all ball surfaces so that about 10 mg of gadolinium could be found on each graphite ball. 1 mg of gadolinium per fuel element ball is able to achieve a reduction of activity of 17 nile in a piled-ball reactor.

EXAMPLE 4

A hollow ball-like shutdown element of graphite without openings other than the pores of the graphite, was filled with gadolinium aluminum isopropoxide. This gadolinium compound at a temperature of 80° C. has a sufficient vapor pressure for reactor shutdown when used in a piled ball reactor. The gadolinium compound in vapor form traverses the pores of the graphite into the free primary coolant spaces of the reactor core and is absorbed on the surfaces of the fuel element balls. Tests were made of the shutdown element at a temperature of 80° C. to 500° C. and with a one-hour test at 300° C., an average of 1.5 mg of gadolinium was deposited per fuel element ball. This corresponded to a reactivity reduction in the reactor core of about 23 nile.

EXAMPLE 5

The gadolinium-containing substance was gadolinium tricyclopentadienyl which was used in the element described in Example 4. At tests in the temperature range of 180° to 750° C. and at about 1150° C., sufficient gadolinium was deposited on the fuel element balls to bring about a significant reactivity reduction.

EXAMPLE 6

The shutdown element of Example 4 was made except that gadolinium acetyl acetonate substituted for the gadolinium compound there used.

This gadolinium compound is unstable in water and has a high vapor pressure. It is also soluble in solvents such as acetone, benzene, ethanol and methanol so that this substance can be utilized not only in a gas phase, but also in a liquid phase, suitably dissolved in one of these solvents. If the gadolinium acetyl acetonate is distributed in the reactor core as a solution, it is sprayed utilizing shutdown elements as described in Examples 1 and 2. An element such as that of Example 3 and composed of steel can be utilized with a solution of the gadolinium acetyl acetonate in methanol. This solution is distributed as has been described in Example 3.

EXAMPLE 7

A shutdown element of steel as in Example 3 was used but, instead of the nozzle-shaped opening, an opening in the form of an inwardly disposed Galton pipe or Hartmann generator was provided. The type of outlet generates an extremely fine atomized spray of the dissolved neutron substance with substantially the same effect as described in Example 3.

EXAMPLE 8

A shutdown element is made by impregnating a solid graphite body (see FIG. 5) with a gadolinium-containing substance, namely gadolinium aluminum isopropoxide or gadolinium acetyl acetate. Tests as in Example 4 show a distribution of gadolinium on the graphite balls equivalent to that of Example 4.

EXAMPLE 9

A hollow ball-shaped shutdown element is made from a metallic material or ceramic, for example aluminum oxide, which contains a glass or quartz ampule (FIG. 6). The latter is received between the shanks of a U-shaped bimetallic spring. The ampule is filled with the gadolinium solution or compound. When the shutdown element is introduced into the nuclear reactor core, the bimetallic spring ruptures the ampule and liberates the shutdown substance. Tests with gadolinium aluminum isopropoxide filled ampules show that the distribution of the absorber substance of the fuel element balls was equivalent to that described in Example 4.

EXAMPLE 10

A hollow ball-shaped shutdown element of steel or liquid and gastight aluminum oxide is provided with one or more closeable nozzles. These nozzles are oriented not radially, but rather at an angle of about 45° to a radius. The nozzle opening has a diameter of 5 mm. When the absorbing substance in expanding and boiling form was expelled from this opening, a torque was generated on the shutdown element which set it in rotation and ensured a uniform distribution of the absorbing substance over the graphite balls of the stack.

EXAMPLE 11

A shutdown element contains an ampule opening having a fine capillary and containing this absorbing substance in a liquid form capable of transforming into gas at the threshold temperature. The absorbing substance passes only slowly through the capillary. This type of shutdown element was found to be effective in controlling local differences of reactivity in the reactor core, the capillary being closed by a fusible element which opens at the temperature threshold.

A slow release of the shutdown substance can also be achieved with a gas-permeable sintered body which may be utilized as a throttle on one of the liquid or gastight shells serving to contain the absorbing substance. Sintered body or fritted bodies of stainless steel, chromium, oxidized chromium or ceramic can be used.

The sintered plug can also be provided with a fusible closure.

When steel shells or ceramic shells are used, they are preferably provided with a graphite coating as has been described in connection with FIG. 8 so that the surfaces of the quenching elements will have substantially the same friction characteristics as the fuel element balls with which they are used. Steel and ceramic shells facilitate machining and precise dimensioning of the orifices and the like and hence exact nozzle geometries.

The substances which can be used to quench the nuclear reaction or to reduce the activity, apart from those described in the Examples, include gadolinium oxalate, gadolinium carbonate and gadolinium boride. Although gadolinium provides by far the best results we have found to date, we may make use of europium and samarian compounds as well.

Furthermore, if the cooling gas circulation is damaged, we may also add neutron-absorbing substances to the cooling gas circulation and these can include indium, iridium, cadmium, boron and dysprosium compounds.

We claim:

1. A method of reducing the reactivity of a gas-cooled nuclear reactor having a core comprising a pile of fuel element balls of graphite, comprising the steps of:

introducing onto said pile at least one ball-shaped quenching element having:

a shell with dimensions corresponding essentially to those of said fuel element balls and formed with a nozzle having a distribution orifice extending through said shell, at least one neutron-absorbing substance contained in said shell from the interior to the exterior which upon heating of said quenching element is driven from said orifice and sprayed therefrom onto said pile, said neutron-absorbing substance being selected from the group which consists of a gadolinium compound, a europium compound and samarium compound, and fusible means blocking said orifice below a predetermined temperature and opening said orifice above a predetermined temperature by thermal fusion as developed in said core and thermally releasing from the interior of said quenching element for dispersing the released neutron-absorbing substance on said fuel element balls from said nozzle; and raising said quenching element to said temperature within said core to effect release of said neutron-absorbing substance through said orifice by unblocking of said orifice.

2. The method defined in claim 1 which comprises imparting spin to said ball-shaped quenching element during the release of said neutron-absorbing substance.

3. In a gas-cooled piled ball nuclear reactor having a core compound of a pile of graphite fuel element balls and a quenching element on said pile for use in reducing the reactivity of said core, said quenching element comprising:

a shell with dimensions corresponding essentially to those of the fuel element balls and formed with a nozzle, having a distribution orifice extending through a wall of said shell from the interior to the exterior;

at least one neutron-absorbing substance contained in said shell and thermally displaceable therefrom through said orifice orifice to deposit on said fuel fuel element balls said nuclear-absorbing substance being selected from the group which consists of a gadolinium compound, a europium compound and a samarium; and fusible means for blocking said orifice to prevent discharge of said neutron-absorbing substance until said quenching element reaches a predetermined temperature and upon said quenching element reaching said predetermined temperature unblocking said orifice by fusion to allow release of said neutron-absorbing substance from said quenching element and deposition of the released neutron-absorbing substance on said fuel element balls.

4. The quenching element defined in claim 3 wherein said orifice extends at an inclination to a radius of said shell.

* * * * *